United States Patent
Dittenhöfer

(10) Patent No.: US 6,543,938 B2
(45) Date of Patent: Apr. 8, 2003

(54) RADIAL-AXIAL ROLLER BEARING

(75) Inventor: Thomas Dittenhöfer, Riedbach (DE)

(73) Assignee: Ina Wälzlager Schaeffler Ohg (DE)

( * ) Notice: Subject to any disclaimer, the term of this patent is extended or adjusted under 35 U.S.C. 154(b) by 0 days.

(21) Appl. No.: 10/232,596

(22) Filed: Aug. 29, 2002

(65) Prior Publication Data

US 2003/0012469 A1 Jan. 16, 2003

Related U.S. Application Data

(63) Continuation of application No. PCT/EP01/00849, filed on Jan. 26, 2001.

(30) Foreign Application Priority Data

Mar. 2, 2000 (DE) .......................... 100 10 295

(51) Int. Cl.[7] .......................... F16C 19/54; F16C 33/60
(52) U.S. Cl. ...................................... 384/455; 384/503
(58) Field of Search ................... 384/452, 454, 384/455, 503

(56) References Cited

U.S. PATENT DOCUMENTS

| | | | |
|---|---|---|---|
| 3,652,141 A | | 3/1972 | Hüsten et al. |
| 3,967,867 A | | 7/1976 | Richardson |
| 4,828,405 A | * | 5/1989 | Sinner .......... 384/455 |
| 4,865,472 A | * | 9/1989 | Jacob .......... 384/503 |
| 4,906,112 A | * | 3/1990 | Gobel et al. .......... 384/455 |
| 4,989,999 A | * | 2/1991 | Siemensmeyer .......... 384/455 |

FOREIGN PATENT DOCUMENTS

| | | |
|---|---|---|
| DE | 2006494 | 8/1971 |
| DE | 2409908 | 10/1974 |
| DE | 3115780 | 11/1982 |
| DE | 3245332 | 6/1984 |
| DE | 3620102 | 12/1987 |
| DE | 3727543 | 3/1989 |
| DE | 9214796 | 10/1992 |
| DE | 9214796 U1 | 2/1993 |
| DE | 29712643 | 10/1997 |
| FR | 2537676 | 6/1984 |
| GB | 1274164 | 5/1972 |

* cited by examiner

Primary Examiner—Thomas R. Hannon
(74) Attorney, Agent, or Firm—Ostrolenk, Faber, Gerb & Soffen, LLP

(57) ABSTRACT

A radial-axial roller bearing, having an inner ring (5), coaxially with which an outer ring (4) is disposed, between which rolling bodies (15) roll in order to absorb radial forces, and having cylindrical rolling bodies (17, 18) disposed in cages (19, 20, 24, 25) on both sides to absorb lateral forces, the tracks of which are formed on one side by the end faces of the outer ring (4) and on the other side by a runner plate (8, 9) in each case.

The inner ring (5) is formed from two part-rings (6, 7), which are integrally connected to the runner plates (8, 9), a separating plane (14) being placed between the part-rings (6, 7) in the track region of the radial bearing (1).

In this manner, a compact, tilt-resistant bearing unit is formed.

9 Claims, 3 Drawing Sheets

RADIAL-AXIAL ROLLER BEARING

CROSS REFERENCE TO RELATED APPLICATIONS

This is a continuation application of PCT/EP01/00849, filed Jan. 26, 2001, which PCT application claims priority of German Patent application number 100 10 295.6, filed Mar. 2, 2000, herein incorporated by reference.

FIELD OF THE INVENTION

The invention relates to a radial-axial roller bearing, having an inner ring, coaxially with which an outer ring is disposed, between which rolling bodies roll in order to absorb radial forces, and having cylindrical rolling bodies disposed in cages on both sides to absorb lateral forces, the tracks of which are formed on one side by the end faces of the outer ring and on the other side by a runner plate in each case.

BACKGROUND OF THE INVENTION

Such a generically combined radial-axial roller bearing is shown on page 136 of the INA catalog Wälzlager 305. It consists of an inner ring, an outer ring disposed coaxially therewith and cylinder rollers rolling between them on associated tracks. The end faces of the outer ring simultaneously form tracks for axial bearings disposed on the right and left, whose other track is formed by a runner plate in each case. The inner ring of the radial bearing is integrally connected to a runner plate of an axial bearing, in other words this part, composed of inner ring and runner plate, is of L-shaped form. The separating plane between this L-shaped component and the other running plate is positioned so that it is placed outside the radial bearing. It lies in the extended radial plane of the running surface of an axial bearing.

A disadvantage of this arrangement is that such a combined bearing arrangement, because of the one runner plate that is not connected to the inner ring, is relatively soft, in other words not tilt-resistant, especially under high stresses. A further disadvantage can be seen in the fact that, because of the differently shaped bearing components, their production is relatively elaborate and hence costly.

SUMMARY OF THE INVENTION

It is therefore an object of the present invention to develop a generic radial-axial roller bearing unit which can be produced cost-effectively and which also possesses high tilt resistance.

This object is achieved, according to the invention, and in accordance with the characterizing clause of claim 1, in that the inner ring is formed from two part-rings which are integrally connected to the runner plates, a separating plane being placed between the part-rings in the track region of the roller bearing.

The advantage of the solution according to the invention lies, in particular, in its increased tilt resistance under high axial forces, the two L-shaped part-rings being centered relative to one another in the track region of the radial bearing by its rolling bodies as a result of the position of their separating plane. This means that, as a result of the contact between the rolling bodies, formed as cylinder rollers, of the radial bearing and the two L-shaped part-rings, a radial offset between the two is precluded.

Thus it is envisaged, that the separating plane is placed in the center of the track region of the radial bearing. This central position permits the two part-rings to be produced as mirror images, and it is also sufficient for the centering of the two part-rings if the separating plane between the two is placed not necessarily at the center of the rolling bodies of the radial bearing but outside it.

It is envisaged that the inner ring is initially machined as a one-piece component and is split into the two part-rings after its production. This manner of production is particularly advantageous, since otherwise different tolerances arise in the tracks and bores if the inner ring is machined as an individual part-ring.

In accordance with another feature of the invention, that the part-rings are retained one upon the other by fixing screws, the number of fixing screws depending on the axially acting forces.

In accordance with an additional feature of the invention it is envisaged that the cylindrical rolling bodies of the axial bearings are each guided by a rim which is disposed either on the outer ring or on the runner plates. The advantage of this alternative solution lies in the fact that the rim now takes over the guidance of the rolling bodies of the axial bearing. In this manner, slip components of the friction are reduced, because better guidance is provided by the rim, in other words the friction of the cylinder rollers on the cage webs is eliminated.

In this case, it may be expedient if the cage is formed not as a whole but, from individual segments abutting one another in the peripheral direction and each receiving a cylindrical rolling body. Advantageously, the segments each have in at least one part-region of their radial extent an arculate line of delimitation lying opposite one another in the peripheral direction in a manner such that a contact point is formed between two neighboring segments and is disposed in the region between the part-circular line and the rim. In this manner, the minimum possible friction between the neighboring segments is achieved. It is also possible for a spring means to be disposed between neighboring segments. Finally, the segments each comprise, on their radially inward sides, two protuberances which are mutually spaced in the peripheral direction. As a result of the contact between these protuberances and the inner ring, rough alignment of the axial bearing is achieved, the fine adjustment thereof being provided by the contact between the rolling bodies and the rim.

The invention will be explained in detail with reference to the examples of embodiment that follow.

DETAILED DESCRIPTION OF THE DRAWINGS

Figure 1:
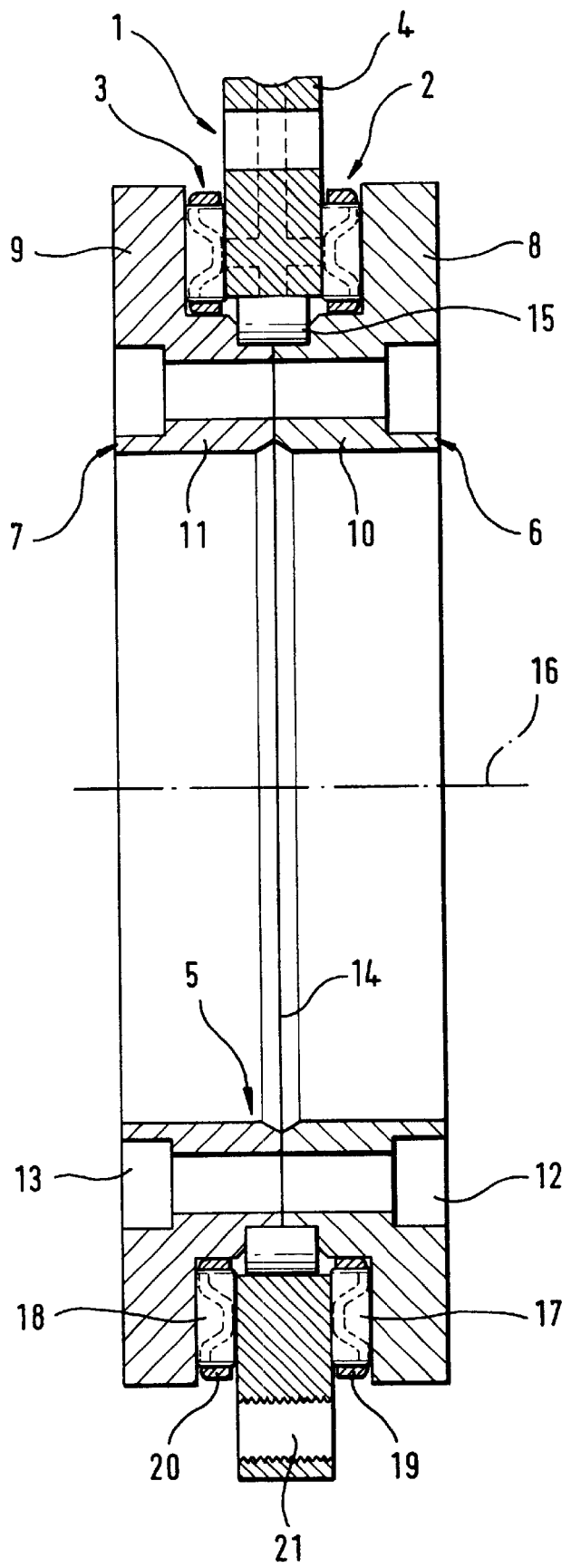
FIG. 1 shows a longitudinal section through a radial-axial bearing unit according to the invention.

The radial-axial roller bearing unit shown in FIG. 1 consists of the radial bearing 1 and the two axial bearings 2 and 3 disposed adjacently to right and left. The radial bearing 1 comprises the outer ring 4, provided with fixing bores 21, and the inner ring 5, these being spaced apart from one another coaxially so that cylinder rollers 15 roll between them. The inner ring 5 is composed of the two part-rings 6 and 7, which in turn consist of the axially extending part 10 and 11 respectively and the two runner plates 8 and 9 of the axial bearings 2 and 3. The part-rings 6 and 7 have an L-shaped form and are in contact with one another at the separating plane 14 by their axially extending parts 10 and 11. This separating plane 14 lies at the center of the inner track of the cylinder rollers 15, so that the two part-rings 6 and 7 are centered by the cylinder rollers 15, in other words no radial offset can occur between the two axially extending parts 10 and 11 of the part-rings 6 and 7. In addition, the part-rings 6 and 7 are provided with fixing bores 12 and 13, through which the fixing screws (not shown) are inserted, thus ensuring the reliable cohesion of the complete bearing unit. The two axial bearings 2 and 3 comprise bearing needles 17 and 18, which are guided in associated cages 19 and 20. The tracks (not shown) of the two axial bearings 2 and 3 are formed on one side by the mutually opposite end faces of the outer ring 4 of the radial bearing 1 and on the other side by the two runner plates 8 and 9, which are integrally connected to the axially extending parts 10 and 11 respectively and thus, in the manner previously described, form the part-rings 6 and 7 of L-shaped design which in turn produce the inner ring 5. The bearing axis for the radial bearing 1 and the axial bearings 2 and 3 disposed on each side is designated 16. The bearing unit shown in FIG. 1 is generally supplied by the manufacturer as a complete unit, in other words with a set prestress. The prestressing of the bearings 1, 2 and 3 is achieved by high-precision machining of the participating components, in other words the prestressing of the radial bearing 1 is set by the distance set between the track of the inner ring 5 and track of the outer ring 4 or by appropriately classified cylinder rollers 15. The prestressing of the two axial bearings 2 and 3, by contrast, is set by the axial thickness of the outer ring 4 and the two runner plates 8 and 9 or by appropriately classified bearing needles 17 and 18. It is evident that a bearing unit of this design according to the invention possesses very great tilt resistance because of its design. The illustration also shows that it appears expedient, in production, first to produce the two part-rings 6 and 7 as a complete component and subsequently to separate them from one another. In this manner, undesirable differences between the fixing bores 12 and 13 and the two inner part-tracks are reliably avoided.

Figure 2:
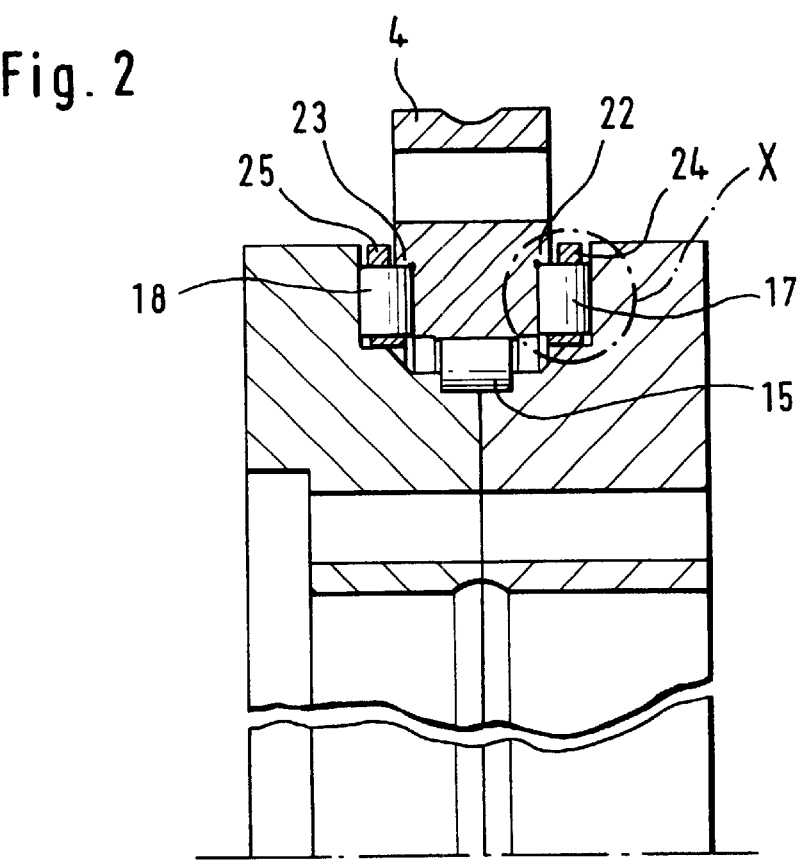
FIG. 2 shows a partial longitudinal section through another alternative embodiment of a bearing unit according to the invention.
Figure 3:
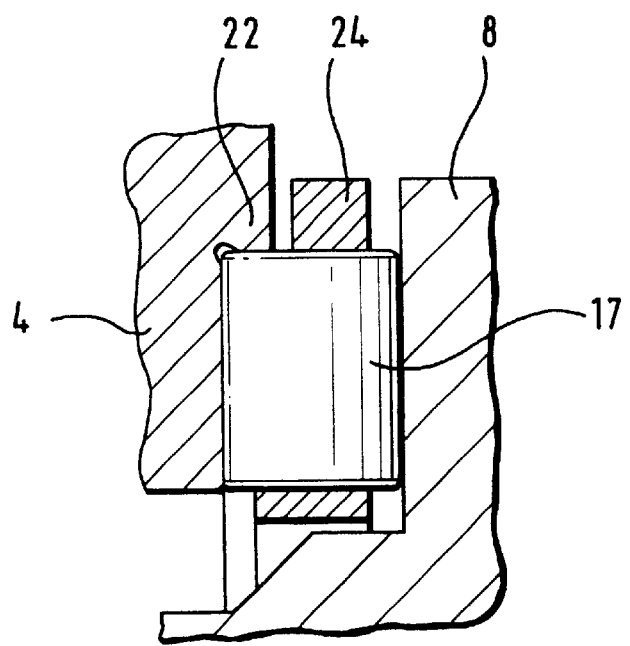
FIG. 3 shows an enlarged illustration of a detail from FIG. 2.

The bearing arrangement shown in FIGS. 2 and 3 differs from that shown in FIG. 1 in that the bearing needles 17 and 18 of the two axial bearings 2 and 3 are each guided by a rim, 22 and 23 respectively, on the end face of the outer ring 4. This means that their plate cages 24, 25 are no longer responsible for guiding the bearing needles 17 and 18 but only for separating them.

It is also possible, of course, in contrast to the arrangement shown, to dispose the two rims 22, 23 not in the outer ring 4 but one on each of the runner plates 8 and 9.

Figure 4:
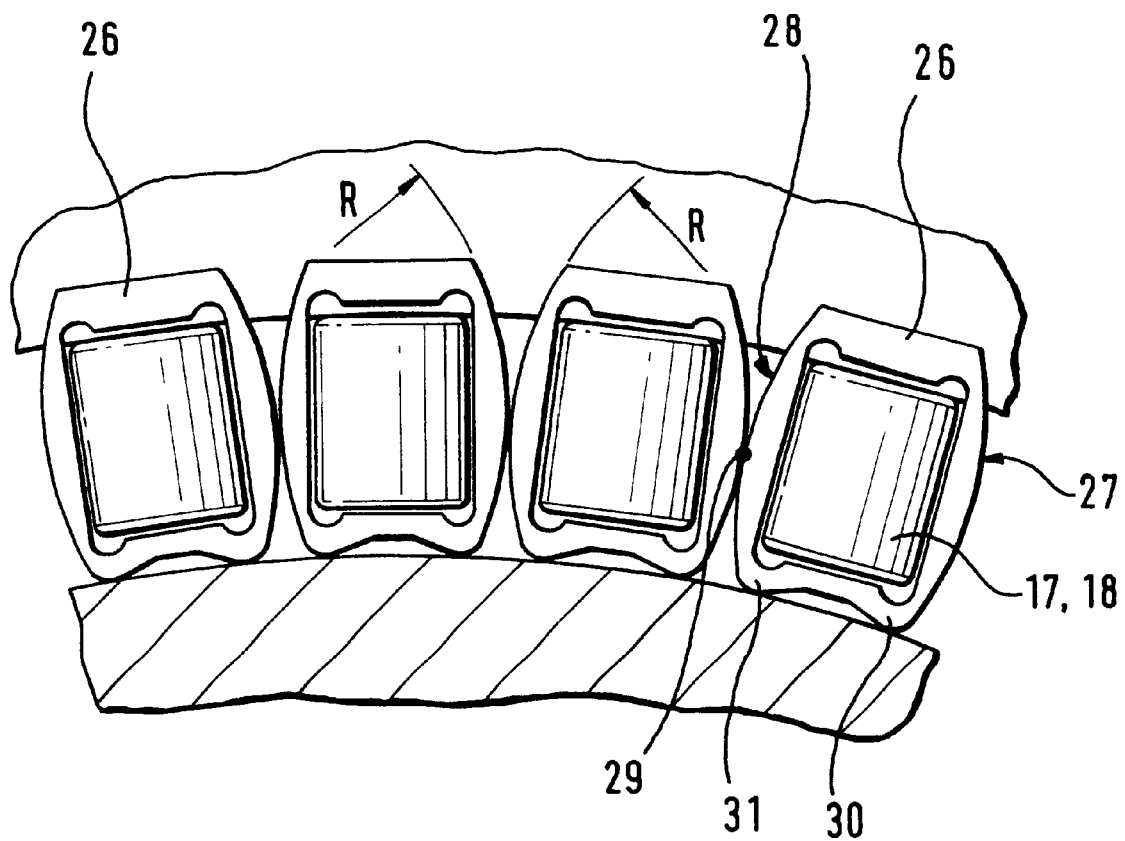
FIG. 4 shows a section from a plan view of individual cage segments.

Finally, in FIG. 4, the bearing needles or the rolling bodies 17 and 18 are accommodated in segments 26 which comprise, on each of their opposite sides in the peripheral direction, an arcuate line of limitation 27 and 28 defined by the radius R, so that when they are in contact the contact point 29 is formed between two neighboring segments 26. In addition, the segments 26 are provided on their radially inward sides with two protuberances 30 and 31, mutually spaced in the peripheral direction and in contact with the surrounding components 10, 11. The advantage of these segments 26 resides in the fact that they can be used for axial bearings 2 and 3 having different sizes in the radial direction.

By this is meant that the runner plates 8 and 9 of the axial bearings 2 and 3 have different radii R. If the radius is increased, in other words if the runner plates 8 and 9 become larger in the peripheral direction, the segments 26 of the same dimensions, including rolling bodies 17, 18, can nevertheless be used, the only effect being that the contact point 29 between two neighboring segments 26 is displaced outward in the radial direction.

Reference Numerals

1 Radial bearing
 2 Axial bearing
 3 Axial bearing
 4 Outer ring
 5 Inner ring
 6 Part-ring
 7 Part-ring
 8 Runner plate
 9 Runner plate
10 Axial part
11 Axial part
12 Fixing bore
13 Fixing bore
14 Separating plane
15 Cylinder roller
16 Bearing axis
17 Bearing needle
18 Bearing needle
19 Cage
20 Cage
21 Fixing bore
22 Rim
23 Rim
24 Plate cage
25 Plate cage
26 Segment
27 Line of limitation
28 Line of limitation
29 Contact point
30 Protuberance
31 Protuberance
R Limiting radius

What is claimed is:

1. A radial-axial roller bearing, having an inner ring (5), coaxially with which an outer ring (4) is disposed, between which rolling bodies (15) roll in order to absorb radial forces, and having cylindrical rolling bodies (17, 18) disposed in cages (19, 20, 24, 25) on both sides to absorb lateral forces, the tracks of which are formed on one side by the end faces of the outer ring (4) and on the other side by a runner plate (8, 9) in each case, characterized in that the inner ring (5) is formed from two part-rings (6, 7), which are integrally connected to the runner plates (8, 9), a separating plane (14) being placed between the part-rings (6, 7) in the track region of the radial bearing (1).

2. The radial-axial roller bearing as claimed in claim 1, characterized in that the separating plane (14) is placed in the center of the track region of the radial bearing (1).

3. The radial-axial roller bearing as claimed in claim 1, characterized in that the inner ring (5) is initially machined as a one-piece component and is split into the two part-rings (6, 7) after its production.

4. The radial-axial roller bearing as claimed in claim 1, characterized in that the part-rings (6, 7) are retained one upon the other by fixing screws.

5. The radial-axial roller bearing as claimed in claim 1, characterized in that the cylindrical rolling bodies (17, 18) of the axial bearings (2, 3) are each guided by a rim (22, 23) which is disposed either on the outer ring (4) or on the runner plates (8, 9).

6. The radial-axial roller bearing as claimed in claim 5, characterized in that the cage of the axial bearings (2, 3) is composed of individual segments (26) abutting one another in the peripheral direction and each receiving a cylindrical rolling body (17, 18).

7. The radial-axial roller bearing as claimed in claim 6, characterized in that the segments (26) each have in at least one part-region of their radial extent an arcuate line of limitation (27, 28) lying opposite one another in the peripheral direction in a manner such that a contact point (29) is formed between two neighboring segments (26) and is disposed in the region between the part-circular line and the rim (22, 23).

8. The radial-axial roller bearing as claimed in claim 6, characterized in that a spring means is disposed between two neighboring segments (26).

9. The radial-axial roller bearing as claimed in claim 6, characterized in that the segments (26) each comprise, on their radially inward sides, two protuberances (30, 31) which are mutually spaced in the peripheral direction.

* * * * *